(12) United States Patent
Fang

(10) Patent No.: US 8,996,439 B2
(45) Date of Patent: Mar. 31, 2015

(54) SCALABLE REASONING USING A POLARITY-BASED MODULE

(75) Inventor: Jun Fang, Xi'an (CN)

(73) Assignee: Empire Technology Development LLC, Wilmington, DE (US)

( * ) Notice: Subject to any disclaimer, the term of this patent is extended or adjusted under 35 U.S.C. 154(b) by 603 days.

(21) Appl. No.: 13/203,969

(22) PCT Filed: Nov. 2, 2010

(86) PCT No.: PCT/CN2010/078322
§ 371 (c)(1),
(2), (4) Date: Aug. 30, 2011

(87) PCT Pub. No.: WO2012/058796
PCT Pub. Date: May 10, 2012

(65) Prior Publication Data
US 2012/0109870 A1      May 3, 2012

(51) Int. Cl.
*G06N 5/02* (2006.01)
*G06N 5/00* (2006.01)

(52) U.S. Cl.
CPC ........................................ *G06N 5/02* (2013.01)
USPC .................................. 706/47; 706/45; 706/59

(58) Field of Classification Search
None
See application file for complete search history.

(56) References Cited

U.S. PATENT DOCUMENTS

| | | | |
|---|---|---|---|
| 5,259,067 A * | 11/1993 | Kautz et al. | 706/57 |
| 2007/0011125 A1 | 1/2007 | Angele | |
| 2007/0074152 A1 * | 3/2007 | Roe | 717/104 |
| 2010/0094906 A1 | 4/2010 | Della-Libera et al. | |
| 2011/0055240 A1 * | 3/2011 | Li et al. | 707/759 |
| 2011/0082828 A1 * | 4/2011 | Fokoue-Nkoutche et al. | 706/50 |
| 2011/0093430 A1 * | 4/2011 | B'Far et al. | 706/55 |

FOREIGN PATENT DOCUMENTS

CN      1435781 A      8/2003

OTHER PUBLICATIONS

Nils J. Nilsson "Principles of Artificial Intelligence" by Tioga publishing Co. Palo Alto CA 1980, pp. 176-177 and 148 and 149.*
Jean-Marc Andreoli, Roberto Maieli and Paul Ruet "Non-commutative proof construction: A constraint-based approach" in Annals of Pured Applied Logic 142 (2006) pp. 212-244.*
Grau, B. et al. "Extracting modules from ontologies: A logic-based approach." Modular Ontologies. Springer Berlin Heidelberg, May 2009. pp. 159-186.*
Berners-Lee, T. et al., The Semantic Web, Scientific American, May 2001.
Stuckenschmidt, H. et al., Structure-Based Partitioning of Large Concept Hierarchies, In Proc. ISWC-2004, pp. 289-303, 2004.
Noy, N. et al., The PROMPT Suite: Interactive Tools for Ontology Merging and Mapping, Int. Journal of Human-Computer Studies, 6(59), 2003.
Seidenberg, J. et al., Web Ontology Segmentation: Analysis, Classification and Use, In Proc. WWW-2006, 2006.

(Continued)

*Primary Examiner* — Kakali Chaki
*Assistant Examiner* — Eric Nilsson
(74) *Attorney, Agent, or Firm* — Maschoff Brennan

(57) ABSTRACT

Modularization-based reasoning of reasoning tasks is provided. Performing a reasoning task includes receiving the reasoning task. Symbols in the reasoning task are interpreted to extract a module from the knowledge base. The reasoning task is them performed with the extracted module to obtain a result of the reasoning task.

22 Claims, 7 Drawing Sheets

(56) References Cited

OTHER PUBLICATIONS

Jimenez-Ruiz, E. et al., Safe and Economic Re-Use of Ontologies: A Logic-Based Methodology and Tool Support, In Proceedings of the 5th European Semantic Web Conference, vol. 5021, pp. 185-199, Springer LNCS, 2008.

Grau, B.C. et al., Modular reuse of ontologies: Theory and practice, Journal of Artificial Intelligence Research, 31:273-318, 2008.

Grau, B.C. et al., Just the right amount: Extracting modules from ontologies, In Proceedings of the 16th International World Wide Web Conference, pp. 717-727. Springer-LNCS, 2007.

Grau, B.C. et al., A Logical Framework for Modularity of Ontologies, In Proceedings of the 20th International Joint Conference on Artificial Intelligence, pp. 298-303, 2007.

D'Aquin, M. et al., Ontology Modularization for Knowledge Selection: Experiments and Evaluations, In DEXA, 2007.

Kalyanpur, A. et al., Finding all Justifications of OWL DL Entailments, In Proceedings of the 6th International Semantic Web Conference, vol. 4825, pp. 267-280, Springer-LNCS, 2007.

Uribe et al., "Qualitative Spatial Reasoning for Question-Answering: Axiom Reuse and Algebraic Methods", American Association for Artificial Intelligence, 2002, pp. 87-94.

Motik et al., "Bridging the gap between OWL and relational databases", Web Semantics: Science, Services and Agents on the World Wide Web, vol. 7, Issue 2, Apr. 2009, pp. 74-89.

Wernhard, "Circumscription and Projection as Primitives of Logic Programming", Technical Communications of the International Conference on Logic Programming, vol. 7, 2010, pp. 202-211.

Fontan et al., Creating and Querying a Domain dependent Know-How Knowledge Base of Advices and Warnings, Proceedings of the workshop on Knowledge and Reasoning for Answering Questions, Aug. 2008, pp. 41-48.

Hustadt et al., "Data Complexity of Reasoning in Very Expressive Description Logics" Morgan-Kaufmann Publishers Inc, 2005, p. 6.

International Search Report and Written Opinion in International Patent Application No. PCT/CN2010/078322 mailed Jul. 7, 2011, 6 pgs.

* cited by examiner

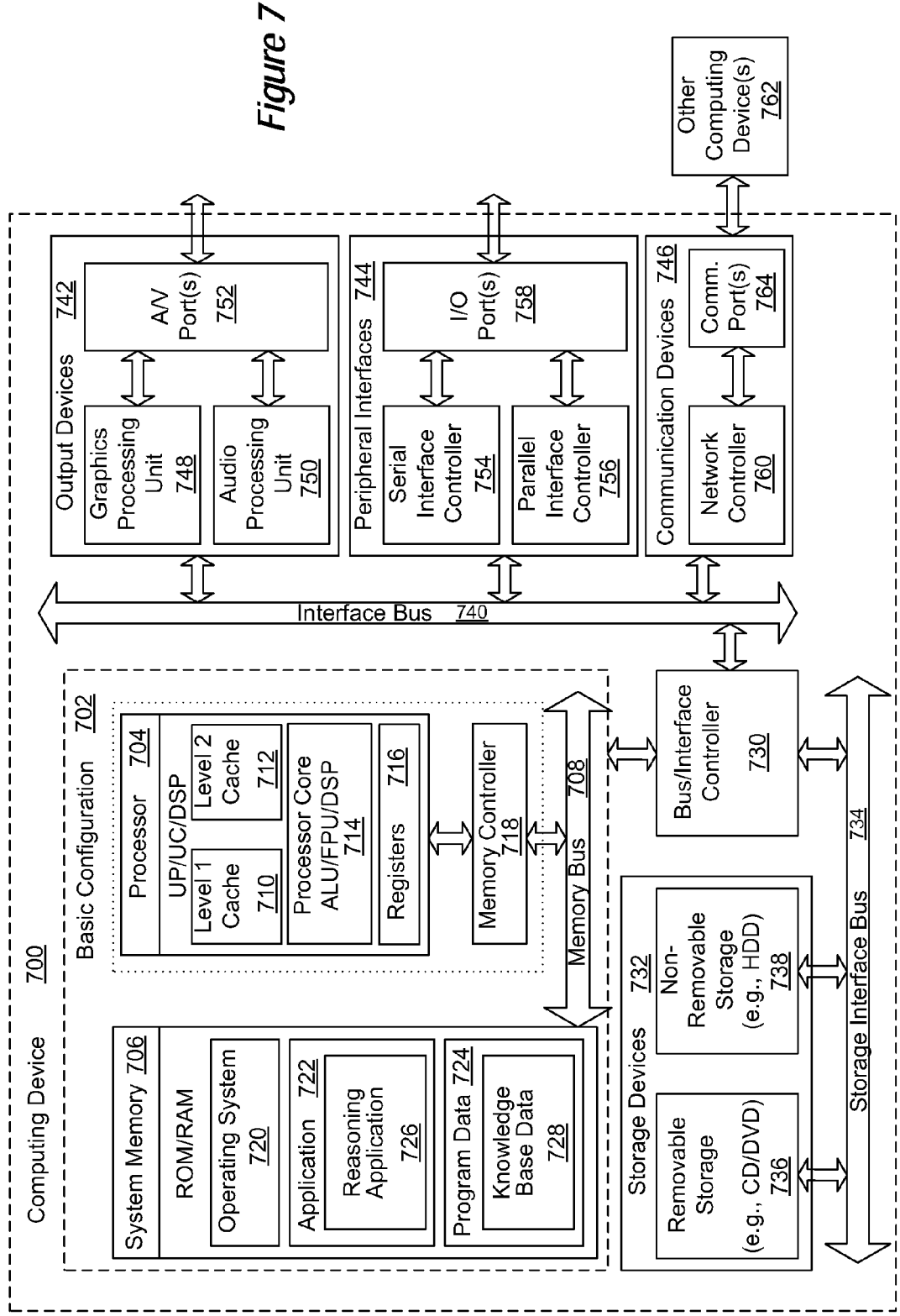

SCALABLE REASONING USING A POLARITY-BASED MODULE

BACKGROUND

The Semantic Web proposes to make information available on the World Wide Web ("Web") so that the information can be understood by both humans and machines. Making information available in a form that can be understood by humans and machines could enable many applications including semantic search, data integration, and others.

The Semantic Web may also make the Web more useable. For example, planning a vacation today often requires a user to visit a multitude of different websites. The user often visits multiple websites in an attempt to find the most convenient and/or cost effective flight. The user may perform a similar task when booking a hotel. Searching for a preview of the destination (e.g., photographs, reviews, things to do) can result in another search of even more websites. The user is then required to assimilate the information that is made available from all of these websites.

The underlying problem is that the actual data the user wants to see and use is not accessible to the user. The user is only able to see the data that the designers of the websites make available to the user. As a result, the user is reduced to visiting multiple websites in order to plan a vacation or to perform other tasks on the Web.

Although there are some websites that try to collect data for the user, the user is still only able to view this data as the data is presented by the website. In addition, there is no guarantee that all potential contributors to the data are included in the data ultimately presented by these websites. For example, information related to certain airlines may not be included the collected data. In another example, restaurant review data almost never includes all available restaurants. These examples illustrate that the user is only able to view data as the data is presented by the website.

In making information available, the Semantic Web aims to link data such that the data becomes independent of the presentation. This enables the user to have better access to the data and also makes it possible for machines to be able to use and interpret the data.

Before machines can interpret the data, the machines need to be able to understand the data. This is where the Semantic Web becomes useful because it attempts to provide a framework such that the data can be understood by machines.

Achieving the goal of the Semantic Web includes the use of knowledge bases or ontologies. The knowledge bases or ontologies attempt to provide relationships between data and provide classifications that allow for reasoning.

Knowledge bases or ontologies, however, can become incredibly complex and detailed. In some ways, this is expected because the ability of a machine to reason is dependent on the quality of the underlying knowledge base. Unfortunately, the size of the knowledge base has a direct impact on the time needed to perform a reasoning task. In fact, the reasoning execution time increases as the volume of the knowledge base increases. As a result, conventional Semantic Web applications are often restricted to small domains.

SUMMARY

Embodiments disclosed herein relate to performing reasoning tasks. Reasoning execution times are scalable by generating modules for performing the reasoning tasks that include sub-sets of entire knowledge bases. In one illustrative embodiment, a method for performing a reasoning task includes receiving the reasoning task. Symbols in the reasoning task are interpreted to extract a module from the knowledge base. The reasoning task is them performed with the extracted module to obtain a result of the reasoning task.

In another illustrative embodiment, a reasoning task includes symbols. Polarity-based modules are generated by interpreting the symbols to identify axioms in a knowledge base that are associated with polarities of the symbols. Each polarity-based module includes a set of axioms. An intersection polarity-based module is then generated by intersecting the polarity-based modules. The axioms in the intersection polarity-based module include the axioms in the polarity-based modules that overlap or that are the same. The reasoning task is then performed with the intersection polarity-based module to determine a result of the reasoning task.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

FIG. 7 is a block diagram illustrating an example computing device that is arranged for performing reasoning tasks.

DETAILED DESCRIPTION

Figure 1:
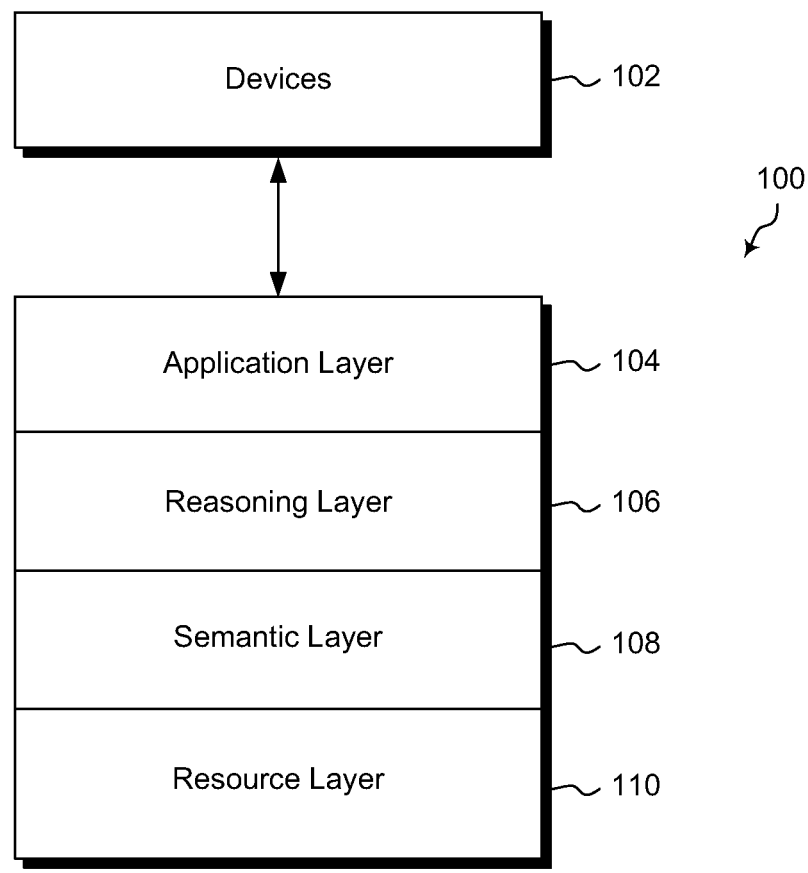
FIG. 1 shows an illustrative embodiment of an architecture of a Semantic Web.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

In the Semantic Web (and in other environments or contexts), reasoning is often performed using an ontology or a knowledge base. Embodiments disclosed herein improve reasoning scalability by extracting modules from the knowledge base. The extracted modules from the knowledge base are then used to perform a reasoning task. Because the extracted modules are smaller than the overall knowledge base, the reasoning scalability is improved. Extracting modules from a knowledge base and performing a reasoning task is an example of modularization-based reasoning.

Embodiments of the modularization-based reasoning disclosed herein ensure at least exactness, compactness, and rapidness. Exactness ensures that results of a reasoning task performed using the extracted modules are the same results that would be achieved if the entire knowledge base or ontology were used. Compactness ensures that the reasoning task involves a minimal or reduced part of the knowledge base. Rapidness ensures that modules are extracted from the knowledge base quickly.

The modularization-based reasoning, including the extraction of the modules from the knowledge base, improves reasoning scalability, for example, in the Semantic Web. Embodiments disclosed herein relate to reasoning scalability and more particularly to reasoning scalability in the context of the Semantic Web.

FIG. 1 shows an illustrative embodiment of an architecture of a Semantic Web 100. FIG. 1 illustrates devices 102 that interface with or access the architecture of the Semantic Web 100 over an appropriate connection. Examples of the devices 102 include computers, cellular devices, smartphones, or the like or combinations thereof.

An application layer 104 illustrates that various applications such as, by way of example only, intelligent search and semantic web service applications are provided in the Semantic Web 100. The devices 102 can use one or more applications in the application layer 104 to access and use the Semantic Web 100.

A reasoning layer 106 illustrates the use of modular-based reasoning to perform reasoning tasks requested by applications in the application layer 104 or by the devices 102. Reasoning modules in the reasoning layer 106 may rely on a semantic layer 108 to reach a result. More specifically, the semantic layer 108 uses various representations and tools (e.g., ontologies or knowledge bases, description logic, etc.) to provide semantics of resources in a resource layer 110. An application in the application layer 104 can initiate a reasoning task that can be performed using the modules extracted in the reasoning layer 106 and the semantics in the semantic layer 108.

Figure 2:
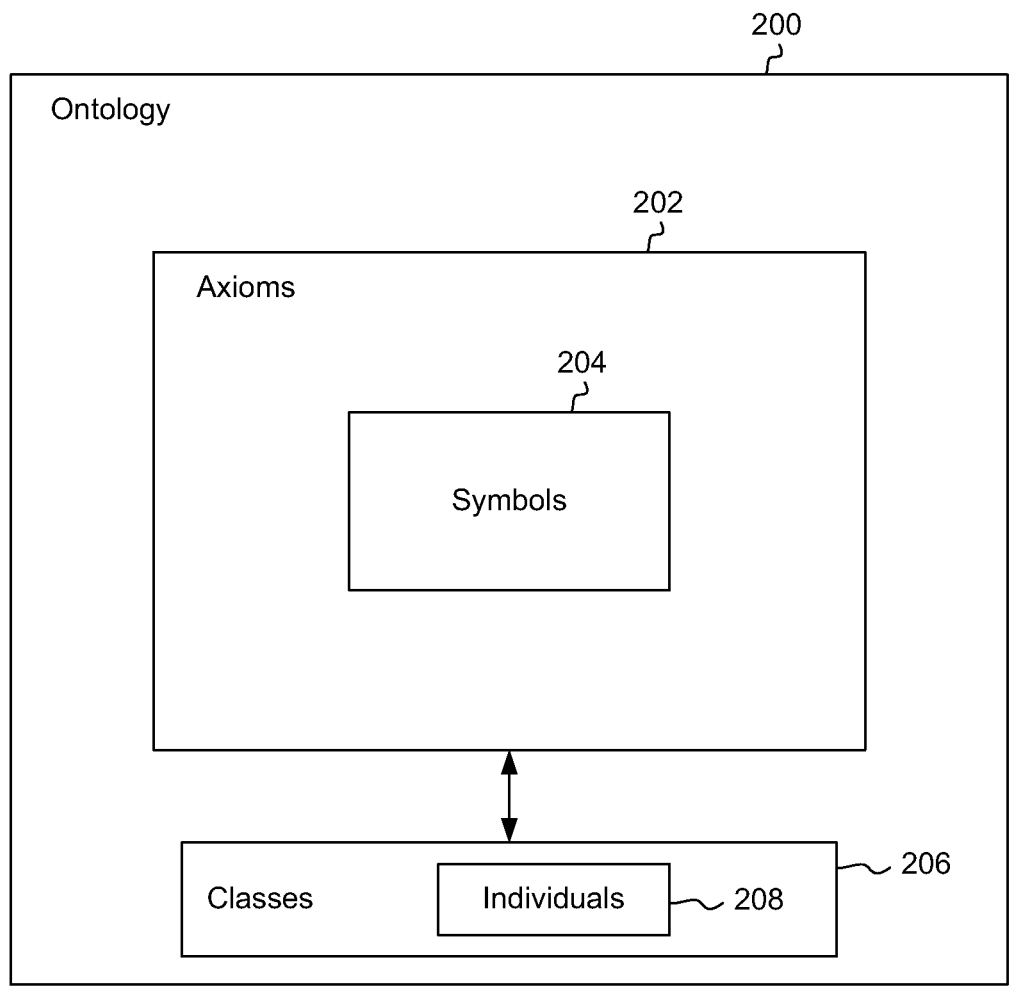
FIG. 2 shows an illustrative embodiment of an ontology.

FIG. 2 illustrates an illustrative example of an ontology 200. The ontology 200 is one example of a knowledge base. The ontology 200 can be constructed from axioms 202 and the axioms 202 can be constructed using symbols 204. The symbols 204, by way of example only, may relate to the intersection or conjunction of concepts, the union or disjunction of concepts, the negation or complement of concepts, inverse, transitivity, functionality, or the like. The following ontology is an example of the ontology 200.

α1: Human ⊑ Animal
α2: Animal ⊑ ∃hasLife.T
α3: Woman ⊑ Human
α4: Mother ⊑ Woman
α5: Man ⊓ Woman ⊑ ⊥
α6: MotherwithoutDaughter ⊑ Mother
α7: MotherwithoutDaughter ⊑ ∀hasChild.¬Woman
α8: MotherwithoutDaughter(Mary)
α9: hasChild(Mary, Peter)
α10: Man(Peter)

The example ontology includes two kinds of symbols, one is concept symbol, which contains Animal, Human, Mother, Woman, Man and MotherwithoutDaughter; another is role symbol which contains hasLife and hasChild in this example. With constructors of some logic languages, axioms can be constructed. In the above example ontology, constructors ⊓, ¬, ⊑, ∃ and ∀ are used to define relationship between concept symbols and role symbols (α1 to α7). For instance, axioms α6 and α7 say that MotherwithoutDaughter is a mother whose children are not women.

The example ontology also contains some individuals: Mary and Peter. The above ontology also includes pattern concepts: The pattern concepts (i) concept(individual) and (ii) role(individual1, individual2) are used to assert individuals. For instance, Man(Peter) says Peter is a man, and hasChild(Mary, Peter) says Mary has a child Peter.

In the ontology 200, the axioms 202 place constraints on individuals 208 and/or concepts 206 in the ontology 200. More specifically, the axioms 202 may identify the relationships among the concepts 206 (which may each include sets of individuals 208). The individuals 208 in the concepts 206 can be related by equivalent concept, subconcept, superconcept, or the like. The axioms 202 provide semantics by allowing information to be inferred from existing data or provide relationships among the individuals 208 and/or the concepts 206.

For example, an ontology describing a family may include axioms with properties that define relationships. The axioms 202, for instance, may state that individuals having a certain blood type never have parents of another blood type (e.g., someone with type O blood does not have parents that have type AB blood). When the ontology 200 is presented with certain information or with a reasoning task, the ontology 200 can be used to perform the reasoning task. For example, the ontology may be presented with information about an individual that has type O blood type. Using the axioms 202, the ontology 200 can be used to reason that the individual is not related (as a child) to any two people having type AB blood. At the same time, the ontology 200 can also be used to reason that the individual may be related to other individuals having the same blood type.

As mentioned above, axioms can be constructed by symbols with proper constructors and every symbol usually has positive and/or negative polarity with respect to an axiom. The polarity can be determined by translating a Description Logic (DL) axiom into a semantically equivalent First-order Logic (FOL) formula in Conjunctive Normal Form (CNF). In the CNF, if the symbol s has negation form, then it has negative polarity, denoted by $s^-$, if the symbol has positive form, then it has positive polarity, denoted by $s^+$. In the above example ontology, all the DL axioms can be translated into following CNF formulas:

$\phi 1$: ¬ Human(x)∨Animal(x)
$\phi 2$: ¬ Animal(x)∨hasLife(x,a)
$\phi 3$: ¬ Woman(x)∨Human(x)
$\phi 4$: ¬ Mother(x)∨Woman(x)
$\phi 5$: ¬ Man(x)¬ Woman(x)
$\phi 6$: ¬ MotherwithoutDaughter(x)∨Mother(x)
$\phi 7$: ¬ MotherwithoutDaughter(x)∨¬ hasChild(x,y)∨¬ Woman(y)
$\phi 8$: MotherwithoutDaughter(Mary)
$\phi 9$: hasChild(Mary, Peter)
$\phi 10$: Man(Peter)

The polarity of each symbol can be determined. For instance, the symbol "Mother" has negative polarity in formula $\phi 4$ (e.g., because of the negation constructor ¬), denoted by $Mother^-$. The symbol "Mother" has positive polarity in formula $\phi 6$, denoted by $Mother^+$.

The notion of polarities can be used to identify a set of axioms from the axioms 202 that are relevant to the interpretation of the symbol. The set of axioms is typically less than all of the axioms 202 in the ontology 200. Thus, the modularization based reasoning disclosed herein can scale the reasoning process by identifying specific modules to use in performing a given reasoning task. Because the modules are less than the whole of the ontology 200, the reasoning execution time is reduced.

Figure 3:
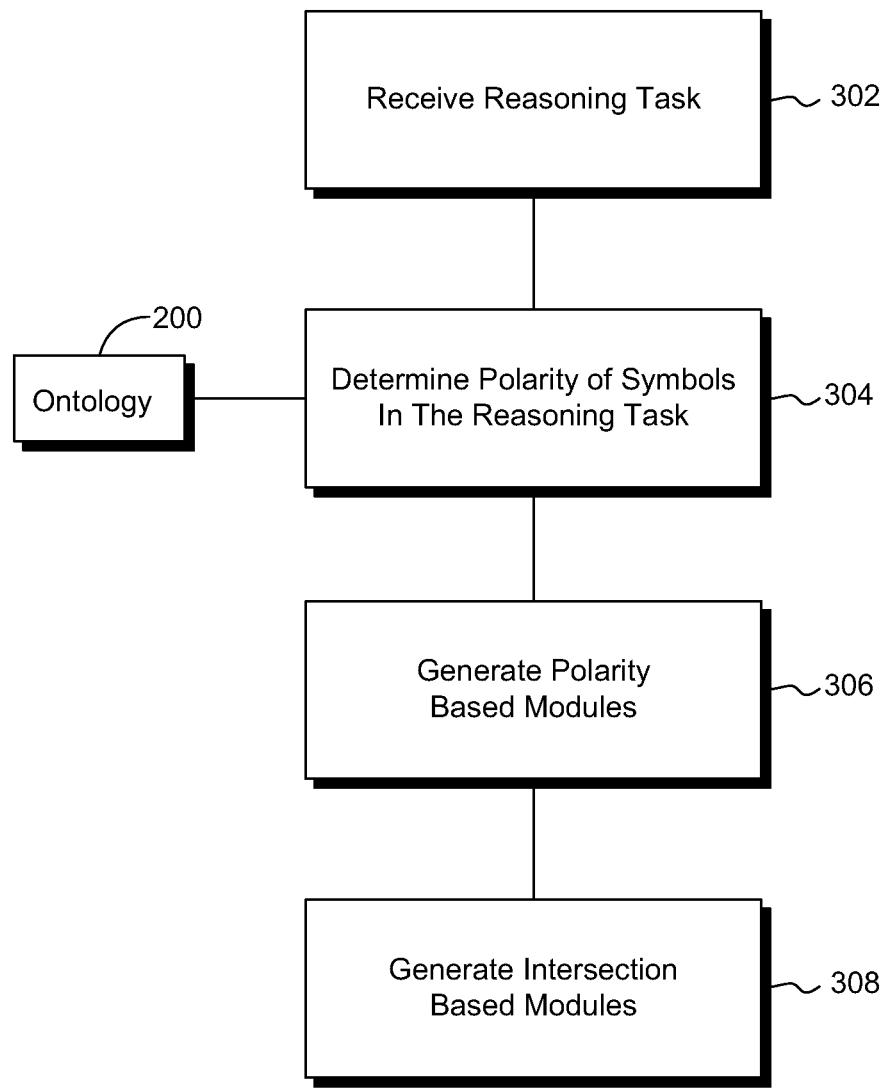
FIG. 3 shows a flowchart of an illustrative embodiment of a method for determining or extracting modules from an ontology.

FIG. 3 shows a flowchart of an illustrative embodiment of a method for determining or extracting modules from an ontology. In block 302 ("Receive Reasoning Task"), a reasoning task is received. The reasoning task may be a search query, a data integration task, or planning, or the like. By way of example only, when an agent is preparing to plan a vacation, a reasoning service may be used to search, compare and select a proper route, a hotel room, or the like. This illustrates an example of a reasoning task that can be performed with modularization based reasoning.

In block 304 ("Determine Polarity of Symbols in the Reasoning Task"), polarity of symbols in the reasoning tasks are determined. For example, the reasoning task may be a reasoning task $\alpha$ that is resolved using the ontology 200.

For every symbol in the reasoning task, the polarity is determined in block 304. As previously discussed, the polarity of a symbol for an axiom can be determined by transforming the axiom into a semantically equivalent First-order Logic formula in Conjunctive Normal Form. More specifically, polarity of symbols with regard to an axiom can be identified by translating the axiom into a CNF formula. Generating polarity-based modules thus includes translating the axioms into CNF formulas in some embodiments.

The positive or negative polarity-based module for a symbol includes axioms which are directly or indirectly resolvable with the polarity symbol or negation of it. In one example, two CNF formulas can be resolved on a symbol A if and only if there exists an atomic formula A such that A is in one of these normal formulas and $\neg A$ is in the other. Determining the polarity of symbols in the reasoning tasks results in a set of polarity symbols $\{p1, p2, \ldots\}$.

In block 306 ("Generate Polarity Based Modules"), polarity-based modules are generated for the opposite polarity of each entry pi in the set of polarity. Axioms relevant to the interpretation of a symbol are identified and separated into axioms relevant to the negative polarity and axioms relevant to the positive polarity.

The polarity-based modules generated in block 306 thus include axioms that are relevant to either the negative polarity or the positive polarity of the axioms relevant to the reasoning task.

More generally, for every entry pi in the set of polarity, a polarity-based module for the opposite of pi is determined in block 306. The polarity-based module for pi can be determined using a linear selection function rs, which uses resolvably relevance in one example to iteratively compute the polarity-based module.

Resolvable relevance can be determined in various ways. Two CNF formulas $\Phi$ and $\phi$ are directly resolvably relevant if and only if there exists an atomic formula A such that A is in one of these normal formulas and $\neg A$ is in the other formula. Alternatively $\Phi$ and $\phi$ are resolvably relevant when they have a resolvent res($\Phi,\phi$) or when $\Phi$ and $\phi$ can be resolved.

Two formulas $\Phi$ and $\Phi'$ are resolvably k-relevant if and only if there exist formulas $\phi_1, \ldots, \phi_k$ such that $\Phi$ and $\phi_1$, res($\Phi,\phi_1$) and $\phi_2, \ldots,$ and res($\ldots$ (res(res($\Phi,\phi_1$),($\phi_2$), $\ldots$ ($\phi_k$) and $\Phi'$ are directly resolvably relevant.

Calculation of polarity p relevant axioms set $\Sigma$ in ontology O is based on linear selection function rs in one example:

$rs(\Sigma,p,0)=\emptyset$ $rs(\Sigma,p,1)=\{\beta\in\Sigma|\beta$ contains polarity which is opposite to $p\}$ $rs(\Sigma,p,k+1)=\{\beta\in\Sigma|\beta$ is resolvably k-relevant to an axiom in $rs(\Sigma,p,1)$ for $k>0$ or $\beta\in rs(\Sigma,p,k)\}$, please note that symbol in p is not considered when calculating res($\Phi, \phi_1$) in the first step, as it is already resolved.

The function may be iteratively calculated until the function rs is stable, i.e., $rs(\Sigma, p, k+1)=rs(\Sigma, p, k)$. Then the final polarity-based module for polarity p in the ontology O is obtained.

For instance, in the example ontology, calculation of MotherwithoutDaughter$^+$ is as follows:

$rs(\Sigma,\text{MotherwithoutDaughter}^+,1)=\{\alpha6,\alpha7\}$ $rs(\Sigma,\text{MotherwithoutDaughter}^+,2)=\{\alpha6,\alpha7,\alpha4,\alpha9\}$ $rs(\Sigma,\text{MotherwithoutDaughter}^+,3)=\{\alpha6,\alpha7,\alpha4,\alpha9,\alpha3\}$ $rs(\Sigma,\text{MotherwithoutDaughter}^+,4)=\{\alpha6,\alpha7,\alpha4,\alpha9,\alpha3,\alpha1\}$ $rs(\Sigma,\text{MotherwithoutDaughter}^+,5)=\{\alpha6,\alpha7,\alpha4,\alpha9,\alpha3,\alpha1,\alpha2\}$ $rs(\Sigma,\text{MotherwithoutDaughter}^+,6)=rs(\Sigma,\text{MotherwithoutDaughter}^+,5)$, so the MotherwithoutDaughter$^+$-based module in $O$ is $\{\alpha6,\alpha7,\alpha4,\alpha9,\alpha3,\alpha1,\alpha2\}$.

When generating the polarity-based modules, the positive polarity and/or the negative polarity of the symbol may be considered. There may be instances where the polarity-based modules only include axioms relevant to the negative polarity or only to the positive polarity.

Moreover, the polarity-based modules determined in block 306 can be calculated offline. As a result, both positive and negative polarity-based modules can be determined for all symbols in the ontology 200 offline. As a result, the determination of the polarity-based modules for the reasoning task in block 306 can be determined or identified quickly from the predetermined positive and negative polarity-based modules that have already been calculated.

In block 308 ("Generate Intersection Based Modules"), intersection polarity-based modules are generated. For a given symbol, the polarity relevant axioms contain all of the information necessary to perform the reasoning task. The intersection of all axiom sets relevant to the polarities of the symbols is also an exact axiom-based module. The intersection of the polarity-based modules results in intersection polarity-based modules. The reasoning task $\alpha$ can be performed on the intersection-based module.

The extraction of the intersection polarity-based modules is used to perform a reasoning task. In other words, the modules identified by the intersection of the polarity-based modules are used to perform a reasoning task. In this sense, the intersection polarity-based modules are extracted from a larger set of the modules The result of the reasoning task performed with the intersection polarity-based modules is the same had the reasoning task been performed with all of the modules. However, the reasoning execution time is reduced, for example, compared to performing the reasoning task with the entire knowledge base. In this way, the extracted modules allow reasoning scalability.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 4:
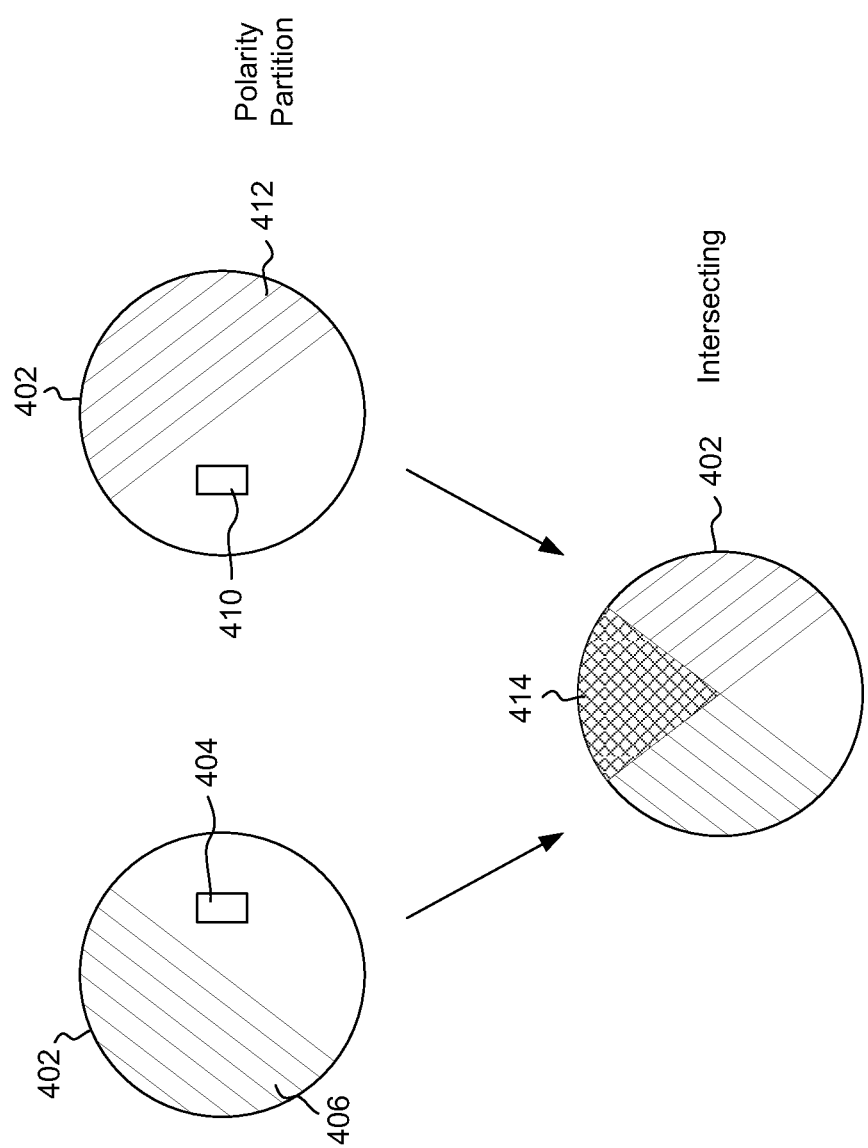
FIG. 4 shows an illustrative embodiment of generating an intersection polarity-based module for a testing axiom that includes multiple symbols.

FIG. 4 shows an illustrative embodiment of generating an intersection polarity-based module for a query axiom that includes multiple symbols. FIG. 4 illustrates a set of axioms 406 in an ontology 402 that is relevant to polarities of a symbol 404. A set of axioms 412 is relevant to polarities of a symbol 410. An intersection of the set of axioms 406 and the set of axioms 412 results in an intersection polarity-based module 414 that may be used for a reasoning task.

Given an query axiom γ:=MotherwithoutDaughter ô Animal in the example ontology, a polarity-based module for polarity opposite to each polarity in the query axiom γ is calculated separately. Axiom γ has polarity MotherwithoutDaughter$^-$ and Animal$^+$. Polarity-based modules are determined. As previously stated, the polarity-based modules are determined for the opposite polarities. Therefore, a polarity-based module for MotherwithoutDaughter$^+$ is {α6, α7, α4, α9, α3, α1, α2}, and a polarity-based module for Animal$^-$ is {α1, α3, α4, α6, α8}. The intersection polarity-based module for γ is {α1, α3, α4, α6}. In this example, the intersection polarity-based module only contains the necessary axioms to perform the reasoning task O|=γ.

Figure 5:
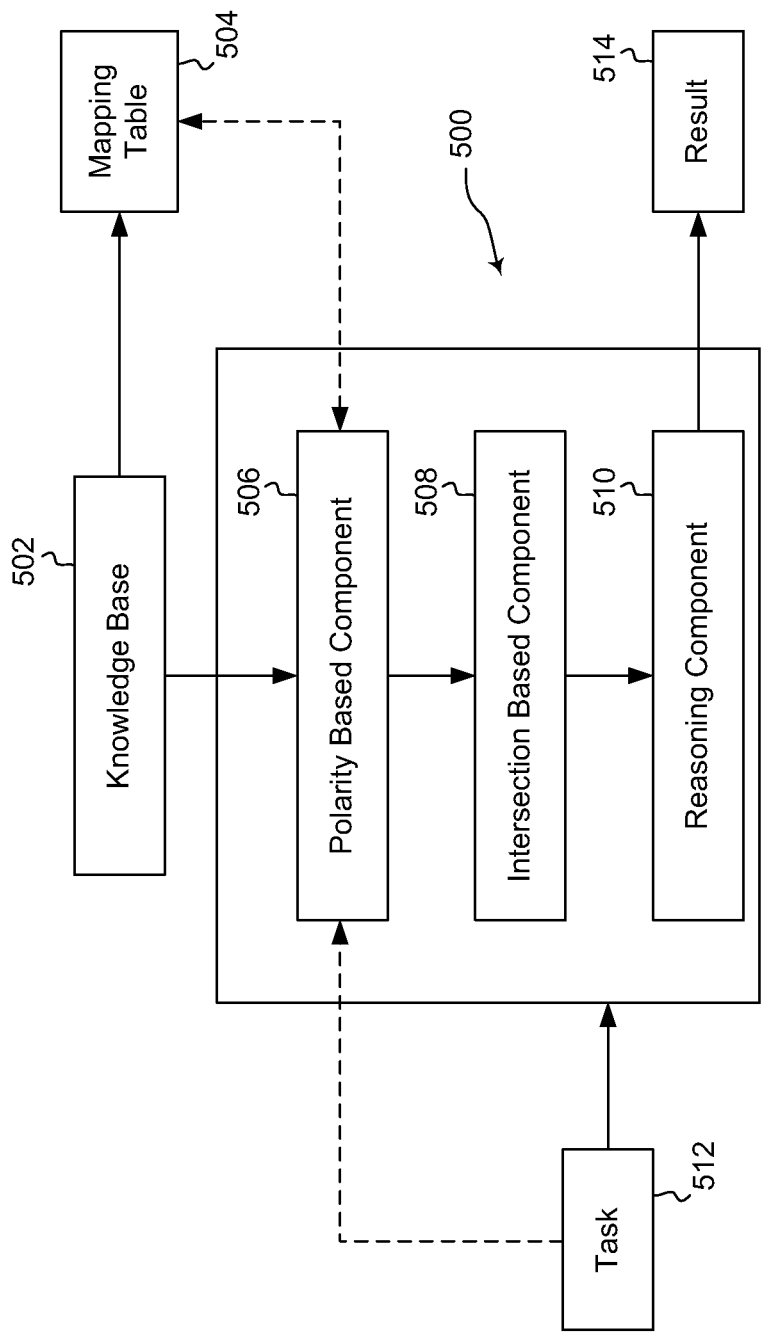
FIG. 5 shows an illustrative embodiment of a system for executing or performing a reasoning task.

FIG. 5 shows an illustrative embodiment of a reasoning system 500 for executing or performing a reasoning task 512. In FIG. 5, a reasoning system 500 includes or has access to a knowledge base 502, which may be an example of the ontology 200. The reasoning system 500 also includes components to perform a reasoning task 512. The components include, in one embodiment, a polarity based component 506, an intersection based component 508, and a reasoning component 510.

The knowledge base 502 is accessed by the polarity-based component 506. The polarity based component 506 can determine polarity relevant information between symbols and axioms in the knowledge base 502 to generate polarity-based modules. In other words, the polarity based component 506 can interpret symbols, which may be included in the reasoning task 512, to identify the axioms that are related to the positive and negative polarities of the symbol. In this example, polarity relevant information includes the axioms that are relevant to the polarities of the symbol.

In one example, the polarity relevant information (e.g., for symbols in the knowledge base 502) can be predetermined offline and stored in a mapping table 504. This enables the polarity-based modules to be determined rapidly by looking up the polarity-based modules in the mapping table 504.

Once the polarity-based modules are determined or generated by the polarity-based component 506, the intersection based component 508 determines an intersection polarity-based module. The reasoning component 510 then performs the reasoning task 512 using the intersection polarity-based module to generate a result 514.

In some instances, only a few axioms are relevant to the reasoning task 512. As a result, the reasoning execution time of the system 500 using the modularization-based reasoning methods disclosed herein can remain relatively constant, even when the size of the knowledge base 502 is large.

In one example, the polarity based component 506 accesses the knowledge base 502 to identify a set of axioms that are relevant to symbols in the reasoning task 512. The set of axioms are grouped into the polarity-based modules. In other words, each polarity-based module typically includes a set of axioms. Each symbol may be associated with one or more polarity-based modules.

The intersection based component 508 intersects the polarity-based modules to identify specific axioms needed to perform the task 512. These axioms are included in the intersection polarity-based module. The reasoning component 510 in the reasoning system 500 then performs the reasoning task 512 using the intersection-based module to generate a result.

Thus, the intersection polarity-based module includes a sub-set of all axioms in the knowledge base. In fact, the sub-set of axioms are all that are needed to perform the reasoning task and the result of the intersection polarity-based module is the same as the result when the entire knowledge base is used to perform the reasoning task 512.

Figure 6:
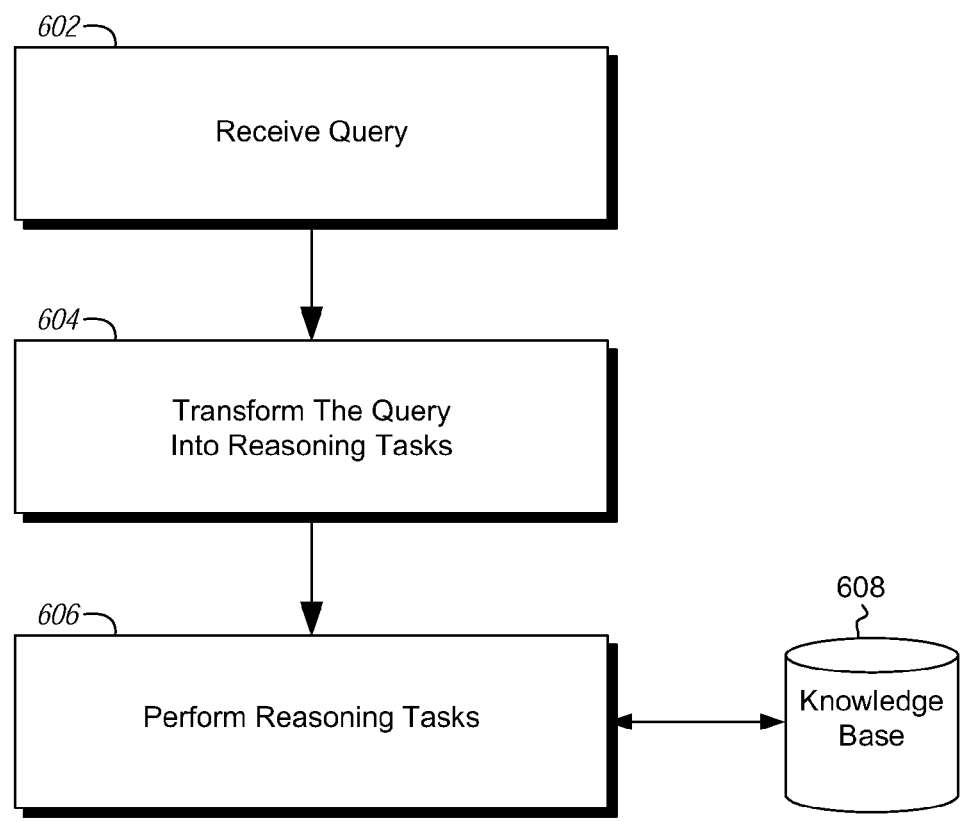
FIG. 6 shows a flowchart of an illustrative embodiment of a method for performing a reasoning task.

FIG. 6 shows a flowchart of an illustrative embodiment of a method for performing a reasoning task. In block 602, a query is received. The query is an example of a reasoning task. The query may be represented as:

$$(x) \leftarrow C(x)P(x,y)D(y).$$

This example of the query is in a conjunctive form, which indicates to select all x which satisfies C(x)P(x,y)D(y) in the knowledge base.

To perform the query, the query is transformed into one or more reasoning tasks in block 604, for example, by substituting x and y with all the possible individuals in a knowledge base 608. For instance, the reasoning tasks are transformed into C(a)P(a,b)D(b), or C(a)P(a,c)D(c).

In block 606, the reasoning tasks identified in block 604 are performed using modularization-based reasoning as described herein. Performing the reasoning tasks may also include extracting modules from a knowledge base 608. In addition, the polarity relevant information between all axioms and symbols can be determined offline and stored to optimize reasoning performance.

Thus, the polarity-based modules are determined and the intersection polarity-based module is determined. The reasoning tasks can then be performed quickly using the modules extracted from the knowledge base 608.

Generally, a method for performing a reasoning task includes receiving a reasoning task that includes symbols. The symbols can be determined from the query. A module can be extracted from a knowledge base by interpreting the symbols. The reasoning task can then be performed with the module to obtain a result of the reasoning task.

Extracting the module may often be performed in stages. In one stage, polarity-based modules are extracted from the knowledge base. The polarity-based modules each typically include a set of axioms from the knowledge base. Often, the sets of axioms are relevant to the polarities of the symbols being interpreted. In another stage, the polarity-based modules are intersected. The intersection of the polarity-based modules identifies the axioms that are included in an intersection polarity-based module. The axioms in the intersection polarity-based module are sufficient to obtain the result of the reasoning task. The result of the reasoning task obtained using the intersection polarity-based module is the same as when the entire knowledge base is used to obtain the result of the reasoning task.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In an illustrative embodiment, any of the operations, processes, etc. described herein can be implemented as computer-readable instructions stored on a computer-readable medium. The computer-readable instructions can be executed by a processor of a mobile unit, a network element, and/or any other computing device.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

FIG. 7 is a block diagram illustrating an example computing device 700 that is arranged for performing reasoning tasks, which includes extracting modules from a knowledge base, in accordance with the present disclosure. In a very basic configuration 702, computing device 700 typically includes one or more processors 704 and a system memory 706. A memory bus 708 may be used for communicating between processor 804 and system memory 706.

Depending on the desired configuration, processor 704 may be of any type including but not limited to a microprocessor (µP), a microcontroller (µC), a digital signal processor (DSP), or any combination thereof. Processor 704 may include one more levels of caching, such as a level one cache 710 and a level two cache 712, a processor core 714, and registers 716. An example processor core 714 may include an arithmetic logic unit (ALU), a floating point unit (FPU), a digital signal processing core (DSP Core), or any combination thereof. An example memory controller 718 may also be used with processor 704, or in some implementations memory controller 718 may be an internal part of processor 704.

Depending on the desired configuration, system memory 706 may be of any type including but not limited to volatile memory (such as RAM), non-volatile memory (such as ROM, flash memory, etc.) or any combination thereof. System memory 706 may include an operating system 720, one or more applications 722, and program data 724. Application 722 may include a reasoning application 726 that is arranged to perform reasoning tasks, which may include the generating of intersection polarity-based modules. Program data 724 may include knowledge base data 728 that is arranged or configured to perform the reasoning tasks. In some embodiments, application 722 may be arranged to operate with program data 724 on operating system 720 such that the reasoning tasks are performed using intersecting polarity-based modules that are extracted from the knowledge base data 728. This described basic configuration 702 is illustrated in FIG. 7 by those components within the inner dashed line.

Computing device 700 may have additional features or functionality, and additional interfaces to facilitate communications between basic configuration 702 and any required devices and interfaces. For example, a bus/interface controller 730 may be used to facilitate communications between basic configuration 702 and one or more data storage devices 732 via a storage interface bus 734. Data storage devices 732 may be removable storage devices 736, non-removable storage devices 738, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 706, removable storage devices 736 and non-removable storage devices 738 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 700. Any such computer storage media may be part of computing device 700.

Computing device 700 may also include an interface bus 740 for facilitating communication from various interface devices (e.g., output devices 742, peripheral interfaces 744, and communication devices 746) to basic configuration 702 via bus/interface controller 730. Example output devices 742 include a graphics processing unit 748 and an audio processing unit 750, which may be configured to communicate to various external devices such as a display or speakers via one or more A/V ports 752. Example peripheral interfaces 744 include a serial interface controller 754 or a parallel interface controller 756, which may be configured to communicate with external devices such as input devices (e.g., keyboard, mouse, pen, voice input device, touch input device, etc.) or other peripheral devices (e.g., printer, scanner, etc.) via one or more I/O ports 758. An example communication device 746 includes a network controller 760, which may be arranged to facilitate communications with one or more other computing devices 762 over a network communication link via one or more communication ports 764.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 700 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 700 may also be implemented as a personal computer including both laptop computer and non-laptop computer configurations.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

The invention claimed is:

1. A method to perform a reasoning task, the method comprising:
   receiving a reasoning task, wherein the reasoning task includes one or more symbols;
   extracting, based on an interpretation of the one or more symbols, polarity-based modules from a knowledge base, wherein the polarity-based modules includes axioms relevant to at least one of a positive polarity and a negative polarity of each of the one or more symbols;
   intersecting the polarity-based modules to identify an intersection polarity-based module that includes axioms from each of the polarity-based modules; and
   performing the reasoning task with the at least one intersection polarity-based module to obtain a result.

2. The method of claim 1, wherein a result of the reasoning task from the intersection polarity-based module is same as a result when the reasoning task is performed with an entirety of the knowledge base.

3. The method of claim 1, wherein the intersection polarity-based module includes axioms relevant to the reasoning task, wherein the axioms relevant to the reasoning task are identified by interpretation of the one or more symbols in the reasoning task.

4. The method of claim 3, further comprising interpreting the one or more symbols to identify the positive polarity of each of the one or more symbols and the negative polarity of each of the one or more symbols.

5. The method of claim 1, further comprising determining polarity relevant information between symbols and axioms in the knowledge base, wherein the polarity relevant information is stored in a mapping table to optimize reasoning execution time of the reasoning task.

6. The method of claim 1, further comprising identifying all axioms in the knowledge base that are directly or indirectly relevant to polarities of the one or more symbols.

7. The method of claim 1, wherein extracting, based on the interpretation of the one or more symbols, polarity-based modules includes:
   determining a set of polarity symbols for each of the one or more symbols in the reasoning task; and
   determining the polarity-based modules by determination of polarity-based modules for each opposite of the one or more polarity symbols in each set of polarity symbols.

8. The method of claim 1, further comprising:
   translating the reasoning task into a semantically-equivalent first-order logic (FOL) formula in conjunctive normal form (CNF);
   for each of the one or more symbols in the reasoning task:
      determining that the corresponding symbol has a positive polarity in response to the corresponding symbol having positive form in the semantically-equivalent FOL formula in CNF; and
      determining that the corresponding symbol has a negative polarity in response to the corresponding symbol having negation form in the semantically-equivalent FOL formula in CNF;
   generating a set of one or more polarity symbols, wherein each of the one or more polarity symbols includes a corresponding polarity of a corresponding one of the one or more symbols; and
   determining the polarity-based modules by determination of polarity-based modules for each opposite of the one or more polarity symbols.

9. The method of claim 8, wherein determining the polarity-based modules comprises determining each of the polarity-based modules according to a linear selection function based on resolvable relevance to iteratively compute the corresponding polarity-based module.

10. A method to perform a reasoning task, the method comprising:
    receiving a reasoning task, wherein the reasoning task includes one or more symbols;
    determining a polarity of each of the one or more symbols;
    determining a set of one or more polarity symbols, wherein each of the one or more polarity symbols includes a corresponding polarity of a corresponding one of the one or more symbols;
    generating polarity-based modules for each opposite of the one or more polarity symbols to identify axioms in a knowledge base that are associated with at least one of a positive polarity and a negative polarity of each of the one or more symbols, wherein each polarity-based module includes a set of axioms;
    generating an intersection polarity-based module from the polarity-based modules by intersection of the polarity-based modules, wherein the intersection polarity-based module includes axioms from each set of axioms that overlap; and performing the reasoning task with the intersection polarity-based module to determine a result.

11. The method of claim 10, wherein receiving the reasoning task comprises:

receiving a query;

transforming the query into at least one reasoning task; and substituting individuals in the knowledge base into the at least one reasoning task.

12. The method of claim 10, wherein generating polarity-based modules comprises separating axioms relevant to the positive polarity and axioms relevant to the negative polarity of each of the one or more symbols.

13. The method of claim 10, wherein the result of the reasoning task using the intersection polarity-based module is the same as a result when an entirety of the knowledge base is used to determine the result.

14. The method of claim 10, wherein the axioms identify properties of individuals in the knowledge base, the method further comprising scaling a reasoning execution time of the reasoning task.

15. The method of claim 14, wherein generating the polarity-based modules comprises computing the polarity-based modules offline, and the method further comprises storing the polarity-based modules in a mapping table to optimize a performance execution time of the reasoning task.

16. The method of claim 10, further comprising translating the reasoning task into a semantically-equivalent first-order logic (FOL) formula in conjunctive normal form (CNF), wherein determining the polarity of each of the one or more symbols comprises:

determining that the corresponding symbol has a positive polarity in response to the corresponding symbol having positive form in the semantically-equivalent FOL formula in CNF; and determining that the corresponding symbol has a negative polarity in response to the corresponding symbol having negation form in the semantically-equivalent FOL formula in CNF.

17. A system to perform a reasoning task, the system comprising:

a polarity-based component configured to access a knowledge base to identify a set of axioms relevant to one or more symbols in the reasoning tasks, wherein the set of axioms are grouped into two or more polarity-based modules;

an intersection based component configured to intersect the two or more polarity-based modules to identify particular axioms to perform the reasoning task, the particular axioms included in an intersection polarity-based module; and a reasoning component configured to perform the reasoning task by use of the intersection polarity-based module to generate a result of the reasoning task.

18. The system of claim 17, further comprising a mapping table configured to store pre-computed polarity-based modules that include the two or more polarity-based modules, wherein the polarity-based component is configured to improve a performance execution time of the reasoning task by access of the mapping table.

19. The system of claim 17, wherein the intersection polarity-based module includes a sub-set of all axioms in the knowledge base, wherein the knowledge base comprises an ontology.

20. The system of claim 19, wherein the intersection polarity-based module is configured to attempt to provide exactness in the result and compactness in the sub-set of all axioms.

21. The system of claim 17, wherein the set of axioms includes axioms whose polarity is opposite to a polarity of the one or more symbols in the reasoning task.

22. The system of claim 17, wherein the polarity-based component is further configured to:

translate the reasoning task into a semantically-equivalent first-order logic (FOL) formula in conjunctive normal form (CNF);

for each of the one or more symbols in the reasoning task:

determine that the corresponding symbol has a positive polarity in response to the corresponding symbol having positive form in the semantically-equivalent FOL formula in CNF; and determine that the corresponding symbol has a negative polarity in response to the corresponding symbol having negation form in the semantically-equivalent FOL formula in CNF;

generate a set of one or more polarity symbols, wherein each of the one or more polarity symbols includes a corresponding polarity of a corresponding one of the one or more symbols; and determine the two or more polarity-based modules by determination of a polarity-based module for each opposite of the one or more polarity symbols.

\* \* \* \* \*

UNITED STATES PATENT AND TRADEMARK OFFICE
CERTIFICATE OF CORRECTION

| | |
|---|---|
| PATENT NO. | : 8,996,439 B2 |
| APPLICATION NO. | : 13/203969 |
| DATED | : March 31, 2015 |
| INVENTOR(S) | : Fang |

It is certified that error appears in the above-identified patent and that said Letters Patent is hereby corrected as shown below:

On the title page, item (57), under "ABSTRACT", in Column 2, Line 5, delete "them" and insert -- then --, therefor.

In the Drawings

In Fig. 7, Sheet 7 of 7, delete "UP/UC/DSP" and insert -- μP/μC/DSP --, therefor.

In the Specification

In Column 1, below Title, insert -- CROSS-REFERENCE TO RELATED APPLICATION
This application is a U.S. national stage filing under 35 U.S.C. § 371 of International Application No. PCT/CN2010/078322, filed on Nov. 2, 2010. --.

In Column 3, Line 48, delete "transivity," and insert -- transitivity, --, therefor.

In Column 6, Line 54, delete "modules" and insert -- modules. --, therefor.

In Column 9, Line 55, delete "and or" and insert -- and/or --, therefor.

In the Claims

In Column 13, Line 62, in Claim 1, delete "the at least one" and insert -- the --, therefor.

Signed and Sealed this
Eleventh Day of August, 2015

Michelle K. Lee
*Director of the United States Patent and Trademark Office*